US008644402B2

(12) United States Patent
Abrishamkar et al.

(10) Patent No.: US 8,644,402 B2
(45) Date of Patent: Feb. 4, 2014

(54) APPARATUS AND METHOD FOR COMPRESSIVE SENSING TAP IDENTIFICATION FOR CHANNEL ESTIMATION

(75) Inventors: Farrokh Abrishamkar, San Diego, CA (US); Ni-Chun Wang, San Diego, CA (US); Ori Shental, Haifa (IL); Yingqun Yu, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 340 days.

(21) Appl. No.: 12/950,452

(22) Filed: Nov. 19, 2010

(65) Prior Publication Data
US 2011/0286558 A1 Nov. 24, 2011

Related U.S. Application Data

(60) Provisional application No. 61/263,891, filed on Nov. 24, 2009, provisional application No. 61/263,885, filed on Nov. 24, 2009.

(51) Int. Cl.
*H04K 1/10* (2006.01)

(52) U.S. Cl.
USPC ........... 375/260; 375/259; 375/262; 375/267; 375/295; 375/316

(58) Field of Classification Search
USPC ......... 375/259, 260, 261, 262, 267, 271, 295, 375/299, 301, 316, 340, 342
See application file for complete search history.

(56) References Cited

U.S. PATENT DOCUMENTS

| 7,436,912 | B2 * | 10/2008 | Fudge et al. .................. 375/340 |
| 7,583,755 | B2 | 9/2009 | Ma et al. |
| 8,213,525 | B2 * | 7/2012 | Caire et al. .................... 375/260 |
| 8,218,658 | B2 | 7/2012 | Hung et al. |
| 8,243,860 | B1 * | 8/2012 | Lee et al. ....................... 375/346 |
| 8,305,843 | B2 * | 11/2012 | Dahl et al. ...................... 367/96 |
| 8,320,489 | B2 * | 11/2012 | Bajwa et al. .................. 375/267 |
| 2005/0281324 | A1 | 12/2005 | Wallen |
| 2009/0222226 | A1 * | 9/2009 | Baraniuk et al. ................ 702/66 |
| 2010/0182950 | A1 * | 7/2010 | Sexton et al. .................. 370/328 |
| 2010/0271931 | A1 * | 10/2010 | Cheng et al. .................. 370/210 |
| 2010/0310011 | A1 * | 12/2010 | Sexton et al. ................. 375/316 |

(Continued)

FOREIGN PATENT DOCUMENTS

TW 200939711 A 9/2009

OTHER PUBLICATIONS

Joel A. Tropp (Random Filters for Compressive Sampling and Reconstruction; 2006, IEEE, pp. 872-875).*

(Continued)

*Primary Examiner* — Hirdepal Singh
(74) *Attorney, Agent, or Firm* — Stanton Braden

(57) ABSTRACT

An apparatus and method for compressive sensing tap identification for channel estimation comprising identifying a set of significant taps in the time domain; representing a time-flat channel response using a Taylor series expansion with the set of significant taps; converting the time-flat channel response to a vectorized channel response; transforming the vectorized channel response to a compressive sensing (CS) polynomial frequency response; aggregating the CS polynomial frequency response into a stacked frequency response; converting the stacked frequency response into a measured pilot frequency response; estimating a channel parameter vector based on the measured pilot frequency response; and generating a reconstructed channel response from the channel parameter vector.

40 Claims, 7 Drawing Sheets

(56) References Cited

U.S. PATENT DOCUMENTS

| | | | | |
|---|---|---|---|---|
| 2011/0006768 | A1* | 1/2011 | Ying et al. | 324/309 |
| 2011/0043710 | A1* | 2/2011 | Samarasooriya et al. | 348/735 |
| 2011/0286498 | A1 | 11/2011 | Abrishamkar et al. | |
| 2011/0286507 | A1 | 11/2011 | Yu et al. | |

OTHER PUBLICATIONS

Yilun Chen (Sparse LMS for System Identification; 2009, IEEE, pp. 3125-3128).*

Nguyen Linh-Trung (Compressed Sensing using Chaos Filters; 2008, IEEE, pp. 219-223).*

Akansu A N, et al., "Emerging applications of wavelets: A review", Physical Communication, vol. 3, No. 1, Mar. 1, 2010, pp. 1-18, XP026833161, ISSN: 1874-4907 [retrieved on Jul. 9, 2009].

Berger C R, et al., "Sparse channel estimation for multicarrier underwater acoustic communication: From subspace methods to compressed sensing", Oceans 2009—Europe, 2009. Oceans '09, IEEE, Piscataway, NJ, USA, May 11, 2009, pp. 1-8, XP031540788, ISBN: 978-1-4244-2522-8.

Berger C R, et al., "Sparse channel estimation for OFDM: Overcomplete dictionaries and super-resolution", Signal Processing Advances in Wireless Communications, 2009. SPAWC '09. IEEE 10th Workshop on, IEEE, Piscataway, NJ, USA, Jun. 21, 2009, pp. 196-200, XP031487816, ISBN: 978-1-4244-3695-8.

Bie Zhisong, et al., "Sparsity-based channel state information acquisition and feedback scheme for MIM0-0FDMA systems", Global Mobile Congress 2009, IEEE, Piscataway, NJ, USA, Oct. 12, 2009, pp. 1-4, XP031551162, ISBN: 978-1-4244-5302-3.

Caire G, et al., "Impulse noise cancellation in OFDM: an application of compressed sensing", Information Theory, 2008. ISIT 2008. IEEE International Symposium on, IEEE, Piscataway, NJ, USA, Jul. 6, 2008, pp. 1293-1297, XP031303118, ISBN: 978-1-4244-2256-2.

Christian D Austin, et al., "On the Relation Between Sparse Sampling and Parametric Estimation", Digital Signal Processing Workshop and 5th IEEE Signal Processing Education Workshop, 2009. DSP/SPE 2009. IEEE 13th, IEEE, Piscataway, NJ, USA, Jan. 4, 2009, pp. 387-392, XP031425875, ISBN: 978-1-4244-3677-4.

Figueiredo M.A.T., et al., "Gradient Projection for Sparse Reconstruction: Application to Compressed Sensing and Other Inverse Problems," IEEE Journal of Selected Topics in Signal Processing, Dec. 1, 2007, pp. 586-597, vol. 1 (4), XP011199163.

Georg Taubock, et al., "A compressed sensing technique for OFDM channel estimation in mobile environments: Exploiting channel sparsity for reducing pilots ", Acoustics, Speech and Signal Processing, 2008, ICASSP 2008, IEEE International Conference on, IEEE, Piscataway, NJ, USA, Mar. 31, 2008, pp. 2885-2888, XP031251194, ISBN: 978-1-4244-1483-3.

International Search Report and Written Opinion—PCT/US2010/057827—ISA/EPO—Apr. 27, 2011.

Lei Huang, et al., "MMSE-Based MDL Method for Robust Estimation of Number of Sources Without Eigendecomposition", IEEE Transactions on Signal Processing, IEEE Service Center, New York, NY, US, vol. 57, No. 10, Oct. 1, 2009, pp. 4135-4142, XP011269156, ISSN: 1053-587X, DOI: DOI:10.1109/TSP.2009.2024043.

Miosso C J, et al., "Compressive Sensing Reconstruction With Prior Information by Iteratively Reweighted Least-Squares", IEEE Transactions on Signal Processing, IEEE Service Center, New York, NY, US, vol. 57, No. 6, Jun. 1, 2009, pp. 2424-2431, XP011253189, ISSN: 1053-587X.

Paredes J.L., et al., "Ultra-Wideband Compressed Sensing: Channel Estimation", IEEE Journal of Selected Topics in Signal Processing, IEEE, Oct. 1, 2007, US, pp. 383-395, vol. 1 (3), XP011193162, ISSN: 1932-4553, DOI: DOI:10.1109/JSTSP.2007.906657.

Soltanolkotabi M, et al., "A practical sparse channel estimation for current OFDM standards", Telecommunications, 2009, ICT 09, International Conference on, IEEE, Piscataway, NJ, USA, May 25, 2009, pp. 217-222, XP031485728, ISBN: 978-1-4244-2936-3.

Waheed Bajwa U, et al., "Sparse Multipath Channels: Modeling and Estimation", Digital Signal Processing Workshop and 5th IEEE Signal Processing Education Workshop, 2009, DSP/SPE 2009, IEEE 13th, IEEE, Piscataway, NJ, USA, Jan. 4, 2009, pp. 320-325, XP031425863, ISBN: 978-1-4244-3677-4.

Waheed U Bajwa, et al., "Learning sparse doubly-selective channels", Communication, Control, and Computing, 2008 46th Annual Allerton Conference on, IEEE, Piscataway, NJ, USA, Sep. 23, 2008, pp. 575-582, XP031435206, ISBN: 978-1-4244-2925-7.

Yaghoobi M, et al., "Compressible dictionary learning for fast sparse approximations", Statistical Signal Processing, 2009, SSP '09. IEEE/SP 15th Workshop on, IEEE. Piscataway, NJ, USA, Aug. 31, 2009, pp. 662-665, XP031540999, ISBN: 978-1-4244-2709-3.

Zayyani H, et al., "Compressed sensing Block MAP-LMS adaptive filter for sparse channel estimation and a Bayesian Cramer-Rao bound", Machine Learning for Signal Processing, 2009. MLSP 2009. IEEE International Workshop on, IEEE, Piscataway, NJ, USA, Sep. 1, 2009, pp. 1-6, XP031557793, ISBN: 978-1-4244-4947-7.

Zhongmin Wang, et al., "Compressed Detection for Pilot Assisted Ultra-Wideband Impulse Radio", Ultra-Wideband, 2007. ICUWB 2007. IEEE International Conference on, IEEE, PI, Sep. 1, 2007, pp. 393-398, XP031159382, ISBN: 978-1-4244-0520-6.

* cited by examiner

APPARATUS AND METHOD FOR COMPRESSIVE SENSING TAP IDENTIFICATION FOR CHANNEL ESTIMATION

CLAIM OF PRIORITY UNDER 35 U.S.C. 119

The present Application for Patent claims priority to Provisional Application No. 61/263,885 entitled Channel Estimation Using Compressive Sensing for LTE and WiMax filed Nov. 24, 2009, and WiMax filed Nov. 24, 2009, and 61/263,891, entitled CSCE Using Taylor Series Expansion, filed Nov. 24, 2009, and assigned to the assignee hereof and hereby expressly incorporated by reference herein.

FIELD

This disclosure relates generally to apparatus and methods for channel estimation in wireless communication. More particularly, the disclosure relates to compressive sensing tap identification for channel estimation.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

SUMMARY

Disclosed is an apparatus and method for compressive sensing tap identification for channel estimation. According to one aspect, a method for compressive sensing tap identification for channel estimation comprising identifying a set of significant taps in the time domain; representing a time-flat channel response using a Taylor series expansion with the set of significant taps; converting the time-flat channel response to a vectorized channel response; transforming the vectorized channel response to a compressive sensing (CS) polynomial frequency response; aggregating the CS polynomial frequency response into a stacked frequency response; converting the stacked frequency response into a measured pilot frequency response; estimating a channel parameter vector based on the measured pilot frequency response; and generating a reconstructed channel response from the channel parameter vector.

According to another aspect, an apparatus for compressive sensing tap identification for channel estimation comprising means for identifying a set of significant taps in the time domain; means for representing a time-flat channel response using a Taylor series expansion with the set of significant taps; means for converting the time-flat channel response to a vectorized channel response; means for transforming the vectorized channel response to a compressive sensing (CS) polynomial frequency response; means for aggregating the CS polynomial frequency response into a stacked frequency response; means for converting the stacked frequency response into a measured pilot frequency response; means for estimating a channel parameter vector based on the measured pilot frequency response; and means for generating a reconstructed channel response from the channel parameter vector.

According to another aspect, an apparatus for compressive sensing tap identification for channel estimation comprising a processor and a memory, the memory containing program code executable by the processor for performing the following: identifying a set of significant taps in the time domain; representing a time-flat channel response using a Taylor series expansion with the set of significant taps; converting the time-flat channel response to a vectorized channel response; transforming the vectorized channel response to a compressive sensing (CS) polynomial frequency response; aggregating the CS polynomial frequency response into a stacked frequency response; converting the stacked frequency response into a measured pilot frequency response; estimating a channel parameter vector based on the measured pilot frequency response; and generating a reconstructed channel response from the channel parameter vector According to another aspect, a computer-readable medium for compressive sensing tap identification for channel estimation, the computer-readable medium storing a computer program, wherein execution of the computer program is for: identifying a set of significant taps in the time domain; representing a time-flat channel response using a Taylor series expansion with the set of significant taps; converting the time-flat channel response to a vectorized channel response; transforming the vectorized channel response to a compressive sensing (CS) polynomial frequency response; aggregating the CS polynomial frequency response into a stacked frequency response; converting the stacked frequency response into a measured pilot frequency response; estimating a channel parameter vector based on the measured pilot frequency response; and generating a reconstructed channel response from the channel parameter vector.

Advantages of the present disclosure may include increase performance and efficiency in the case of channel sparsity.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
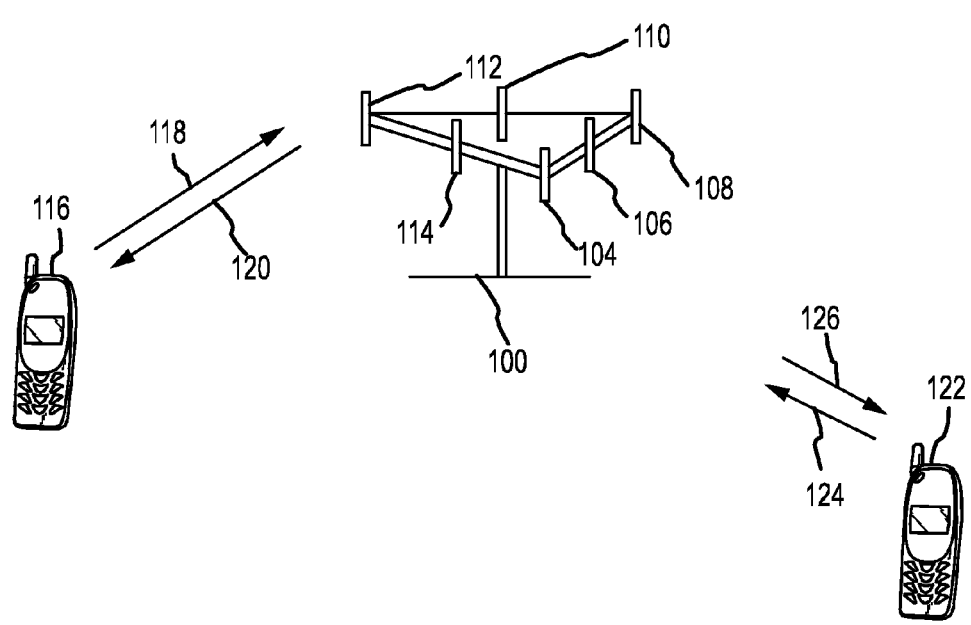
FIG. 1 illustrates an example multiple access wireless communication system according to one example.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a transmission technique. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an eNodeB or some other terminology. An access terminal may also be called a mobile terminal, a mobile device, a user equipment (UE), a wireless communication device, terminal, access terminal or some other terminology.

Figure 2:
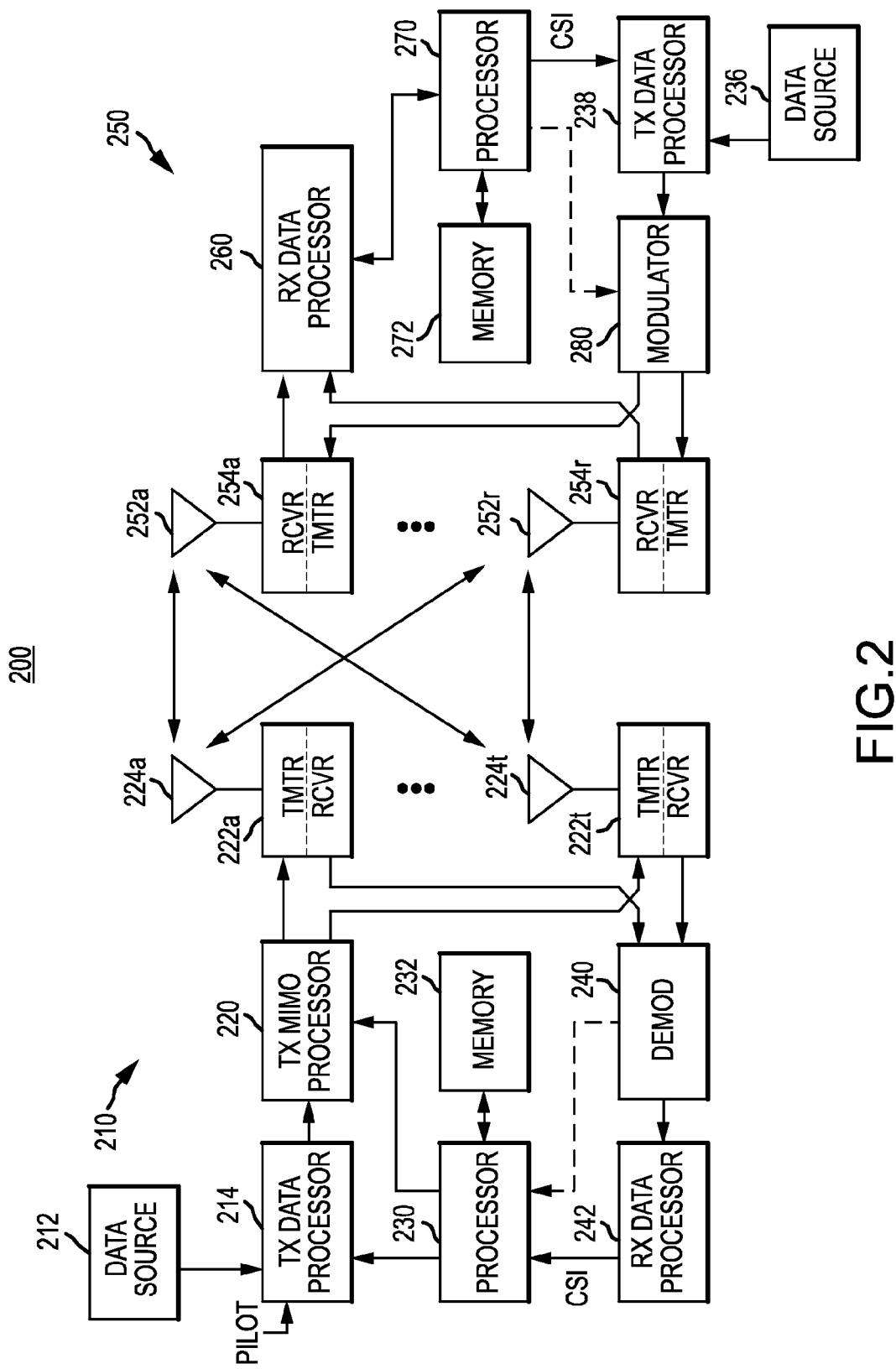
FIG. 2 illustrates an example block diagram of a transmitter system (also known as access point) and a receiver system (also known as access terminal) in a multiple input multiple output (MIMO) system.

FIG. 2 illustrates an example block diagram of a transmitter system 210 (also known as access point) and a receiver system 250 (also known as access terminal) in a multiple input multiple output (MIMO) system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
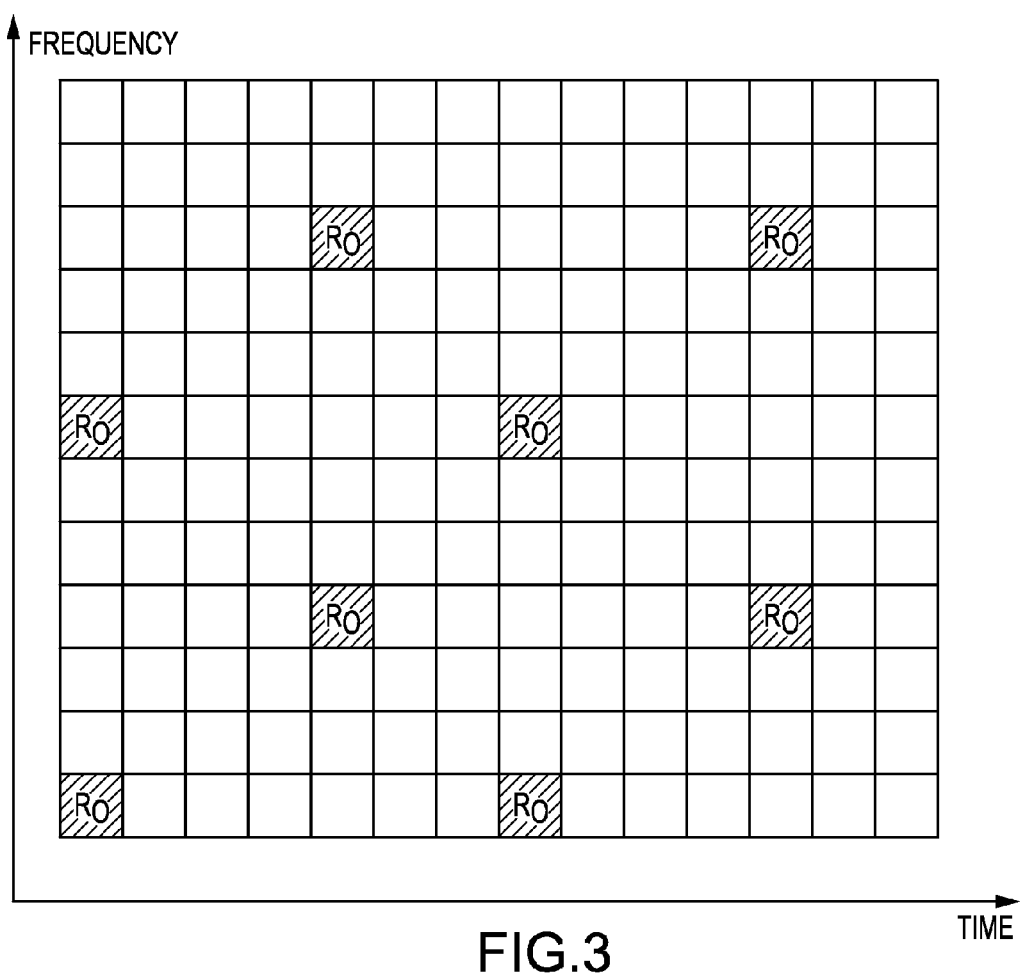
FIG. 3 illustrates an example cell-specific RS arrangement with a normal cyclic prefix (CP) length.

In one aspect, the LTE downlink provides reference signals (RSs), i.e., pilots, within certain locations within an OFDM time-frequency lattice. For example, FIG. 3 illustrates an example cell-specific RS arrangement with a normal cyclic prefix (CP) length. As shown, the RS symbols are shown staggered in the time dimension and frequency dimension according to the expected channel coherence bandwidth and maximum Doppler spread, respectively.

In an aspect, logical channels are classified into Control Channels and Traffic Channels. Logical Control Channels comprise Broadcast Control Channel (BCCH) which is DL channel for broadcasting system control information, Paging Control Channel (PCCH) which is DL channel that transfers paging information, and Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into downlink (DL) and uplink (UL). DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), a Uplink Shared Data Channel (UL-SDCH) and plurality of PHY channels. The PHY channels comprise a set of DL channels and UL channels.

In one aspect, the DL PHY channels may comprise one or more of the following:

| | |
|---|---|
| Common Pilot Channel | (CPICH) |
| Synchronization Channel | (SCH) |
| Common Control Channel | (CCCH) |
| Shared DL Control Channel | (SDCCH) |
| Multicast Control Channel | (MCCH) |
| Shared UL Assignment Channel | (SUACH) |
| Acknowledgement Channel | (ACKCH) |
| DL Physical Shared Data Channel | (DL-PSDCH) |
| UL Power Control Channel | (UPCCH) |
| Paging Indicator Channel | (PICH) |
| Load Indicator Channel | (LICH) |

In one aspect, the UL PHY channels may comprise one or more of the following:

| | |
|---|---|
| Physical Random Access Channel | (PRACH) |
| Channel Quality Indicator Channel | (CQICH) |
| Acknowledgement Channel | (ACKCH) |
| Antenna Subset Indicator Channel | (ASICH) |
| Shared Request Channel | (SREQCH) |
| UL Physical Shared Data Channel | (UL-PSDCH) |
| Broadband Pilot Channel | (BPICH) |

In one aspect, a channel structure is provided that preserves low peak to average power ratio (PAPR) properties of a single carrier waveform (i.e., at any given time, the channel is contiguous or uniformly spaced in frequency).

For the purposes of the present disclosure, one or more of the following abbreviations may apply:

| | |
|---|---|
| AM | Acknowledged Mode |
| AMD | Acknowledged Mode Data |
| ARQ | Automatic Repeat Request |
| BCCH | Broadcast Control CHannel |
| BCH | Broadcast CHannel |
| C- | Control- |
| CCCH | Common Control CHannel |
| CCH | Control CHannel |
| CCTrCH | Coded Composite Transport Channel |
| CoMP | coordinated multi point |
| CP | Cyclic Prefix |
| CRC | Cyclic Redundancy Check |
| CTCH | Common Traffic CHannel |
| DCCH | Dedicated Control CHannel |
| DCH | Dedicated CHannel |
| DL | DownLink |
| DL-SCH | downlink shared channel |
| DSCH | Downlink Shared CHannel |
| DTCH | Dedicated Traffic Channel |
| DCI | Downlink Control Information |
| FACH | Forward link Access CHannel |
| FDD | Frequency Division Duplex |
| L1 | Layer 1 (physical layer) |
| L2 | Layer 2 (data link layer) |
| L3 | Layer 3 (network layer) |
| LI | Length Indicator |
| LSB | Least Significant Bit |
| LTE | Long Term Evolution |
| LTE-A | LTE-Advanced or Long Term Evolution - Advanced |
| MAC | Medium Access Control |
| MBMS | Multimedia Broadcast Multicast Service |
| MBSFN | multicast broadcast single frequency network |
| MCCH | MBMS point-to-multipoint Control CHannel |
| MCE | MBMS coordinating entity |
| MCH | multicast channel |
| MRW | Move Receiving Window |
| MSB | Most Significant Bit |
| MSCH | MBMS point-to-multipoint Scheduling Channel (depending on context) |
| MSCH | MBMS control channel (depending on context) |
| MTCH | MBMS point-to-multipoint Traffic CHannel |
| PBCH | Physical Broadcast CHannel |
| PCCH | Paging Control CHannel |
| PCFICH | Physical Control Format Indicator Channel |
| PCH | Paging CHannel |
| PDCCH | physical downlink control channel |
| PDSCH | physical downlink shared channel |
| PDU | Protocol Data Unit |
| PHICH | Physical Hybrid ARQ Indicator CHannel |
| PHY | PHYsical layer |
| PhyCH | Physical Channels |
| PMCH | Physical Multicast Channel |
| PRACH | Physical Random Access Channel |
| PUCCH | Physical Uplink Control Channel |
| PUSCH | Physical Uplink Shared Channel |
| RACH | Random Access CHannel |
| RLC | Radio Link Control |
| RRC | Radio Resource Control |
| SAP | Service Access Point |
| SDU | Service Data Unit |
| SHCCH | SHared channel Control CHannel |
| SN | Sequence Number |
| SNR | signal-to-noise ratio |
| SUFI | SUper FIeld |
| TCH | Traffic CHannel |
| TDD | Time Division Duplex |
| TFI | Transport Format Indicator |
| TM | Transparent Mode |
| TMD | Transparent Mode Data |
| TTI | Transmission Time Interval |
| U- | User- |
| UE | User Equipment |
| UL | UpLink |
| UM | Unacknowledged Mode |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |

Long Term Evolution (LTE) is a next-generation evolution of the Universal Mobile Telecommunications System (UMTS), a worldwide protocol family for wireless communications. LTE provides several new technological features compared to previous wireless technologies including OFDM multicarrier transmission, provisions for multiple antennas for both transmit and receive, and an Internet protocol (IP) packet switching network infrastructure. In particular, OFDM relies on a two-dimensional array of orthogonal time and frequency resources which may be aggregated in many flexible ways to provide a wide variety of user services.

In one aspect, a mobile station or mobile terminal that a user carries for wireless communications is known as user equipment (UE). In general, the UE connects to other users either within the wireless network or the general communications infrastructure such as the public switched telephony network (PSTN), Internet, private networks, wide area networks (WANs), etc. via a wireless bidirectional link to an evolved NodeB (eNodeB), also known generically as a base station, which represents the wireless network access node for the UE. Other wireless network elements separate from the access nodes (e.g. eNodeBs) are considered part of the core network (CN). The eNodeB is connected to other network elements such as the serving gateway (S-GW) and the Mobility Management Entity (MME). In one aspect, the S-GW serves as a mobility anchor for data bearers when the UE moves between different eNodeBs. In another aspect, the MME serves as a control entity for managing the signaling between the UE and the core network (CN). The S-GW interfaces with the packet data network gateway (P-GW), which functions as a LTE portal to the global Internet, for example. The P-GW also allocates IP addresses for the UE and enforces quality of service (QoS) based on policy rules.

In one aspect, the downlink resources in LTE are partitioned into smaller elemental time and frequency resources. In one example, in the time dimension, a radio frame has 10 ms duration and is divided into ten subframes, each of 1 ms duration. Furthermore, each subframe is divided into two 0.5 ms slots. In the case of a normal cyclic prefix length, each slot comprises seven OFDM symbols. In the frequency dimension, a Resource Block (RB) is a group of 12 subcarriers each with a subcarrier bandwidth of 15 kHz. A subcarrier is also denoted as a tone, for example. One Resource Element (RE) is the smallest resource unit in LTE which consists of one subcarrier and one OFDM symbol.

In another aspect, certain Resource Blocks are dedicated for special signals such as synchronization signals, reference signals, control signals and broadcast system information. For example, three essential synchronization steps in LTE may be necessary: symbol timing acquisition, carrier frequency synchronization, and sampling clock synchronization. In one example, LTE relies on two special synchronization signals for each cell: the Primary Synchronization Signal (PSS) and the Secondary Synchronization Signal (SSS) which are used for time and frequency synchronization and for broadcasting of certain system parameters such as cell identification, cyclic prefix length, duplex method, etc. In general, the PSS is detected by the UE first, followed by SSS detection.

In one aspect, the PSS is based on a Zadoff-Chu sequence, a constant amplitude chirp-like digital sequence. In general, the PSS is detected non-coherently (i.e., detection without phase information) by the UE since there is assumed to be no a priori channel information available by the UE. In another aspect, the SSS is based on a maximal length sequence (also known as M-sequence). Since the detection of the SSS is performed after the detection of the PSS, if channel state information (CSI) is available to the UE after PSS detection, then coherent detection (i.e., detection with phase information) of the SSS may be available. In certain scenarios, however, non-coherent detection of the SSS may be required, for example, in the case of coherent interference from neighboring eNodeBs.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Channel estimation in OFDM wireless system may employ multiple amplitude signaling schemes that track fading radio channels. OFDM is a significant modulation technique for digital communication on mobile multipath fading channels. In one example, to perform coherent demodulation on the received signals it is necessary to have knowledge of the time-varying channel transfer function.

For OFDM systems, the channel transfer function may be conveniently estimated using a two dimensional grid of pilot symbols, that is, over symbol time and discrete frequency tone. The Digital Video Broadcasting Terrestrial (DVB-T) standard is one such example. However, channel capacity is wasted due to the transmission of the pilot symbols in these systems.

One alternative is to use differential phase shift keying (DPSK) and differentially coherent demodulation to obviate the need for channel estimation. For example, DPSK has been successfully implemented in the Digital Audio Broadcasting standard. However, differential detection results in a bit energy to noise density ratio penalty of, for example, approximately 2 dB for an additive white Gaussian network (AWGN) channel and a larger loss for fading channels.

In one aspect, it is desirable to enable coherent demodulation while implementing channel estimation without the need for pilot symbols. One technique, known as blind channel estimation, has been employed, but its performance has not been comparable to that of pilot-based channel estimation.

In one aspect, a channel matrix is used as a model for the channel propagation characteristics between the transmitter and receiver. Channel estimation then refers to the estimation of the parameters of the channel matrix. Most existing techniques for channel estimation use minimum mean square error (MMSE) or least square (LS) techniques. However, these estimation techniques do not take advantage of channel sparsity, thereby resulting in significant performance loss. In one aspect, compressive sensing (CS) techniques may be used to perform channel estimation under the condition of sparsity, that is, when the channel matrix is comprised of mostly zeros.

Thus, it is desirable to derive channel estimation techniques which outperform current non-compressive sensing approaches for both LTE and WiMax systems, especially for high Doppler fading channels and which also require significantly less pilot symbols.

In one aspect, a compressive sensing tap identification technique for channel estimation in OFDM wireless systems attains superior performance for narrowband OFDM systems, for example, WiMax and LTE. In one example, this technique provides better compressive sensing performance for OFDM channel estimation than existing techniques.

In one aspect, a compressive sensing tap identification technique for channel estimation first uses L1 norm minimization to identify active taps for a channel response and then uses conventional L2 norm minimization to estimate active tap values.

In one example, a time domain response h having length D may be represented in the frequency domain as $$\begin{bmatrix} H_1 \\ H_2 \\ \vdots \\ H_K \end{bmatrix} = F_{K \times D} \begin{bmatrix} h_{01} \\ h_1 \\ \vdots \\ h_{D-1} \end{bmatrix}$$

where H is a channel spectrum corresponding to a channel impulse response h and $F_{K \times D}$ is a Fourier matrix. Alternatively, h may be viewed as the projection of H along the column space, i.e. the basis, of the discrete Fourier transform (DFT) matrix:

$$\underline{X} = \Psi \underline{s}$$

where $\Psi$ is the discrete Fourier transform matrix, s is a time domain vector and X is a frequency domain vector.

In one aspect, pilot measurements may be performed according to the following equation to obtain a pilot spectrum from the channel spectrum:

$$\Phi \begin{bmatrix} H_1 \\ H_2 \\ \vdots \\ H_K \end{bmatrix} = \underbrace{\Phi F_{K \times D}}_{W} \begin{bmatrix} h_{01} \\ h_1 \\ \vdots \\ h_{D-1} \end{bmatrix} \Leftrightarrow \underline{Y} = W \underline{s}$$

where $\Phi$ is a pilot matrix. In one aspect, since the number of pilots is less than the time domain vector length D, the time domain vector s is sparse and the sensing matrix W follows a uniform uncertainty principle (UUP), compressed sensing may be used to identify significant taps in the channel model.

Figure 4:
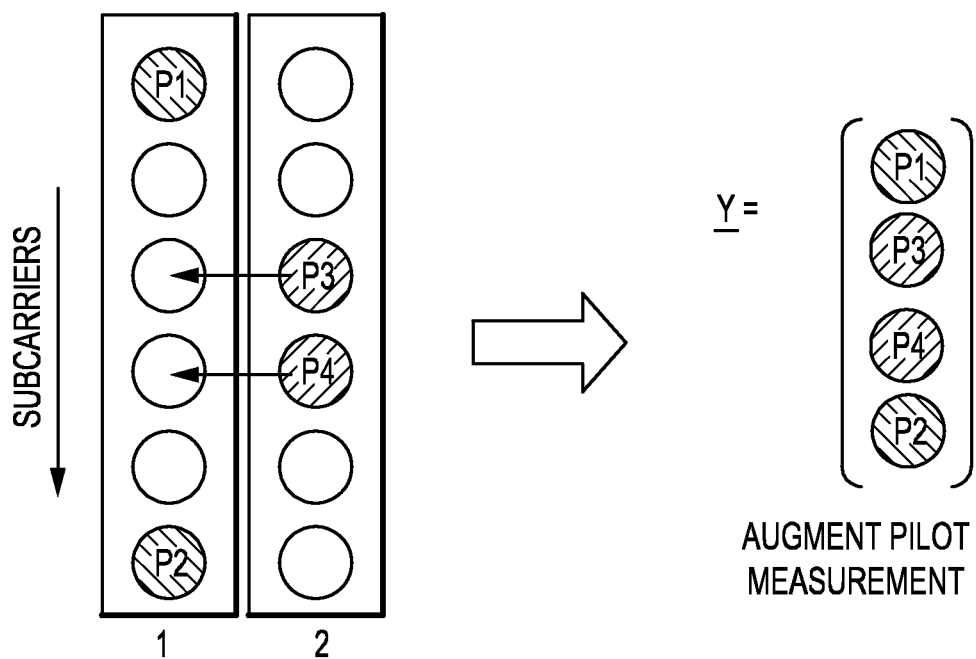
FIG. 4 illustrates an example of an augmented pilot measurement using a neighboring OFDM symbol time.

In another aspect, the pilot spectrum $\Phi H$ may be augmented. In one example, to increase the pilots per OFDM symbol time, one may borrow from a neighboring OFDM symbol time for the same subcarrier. FIG. 4 illustrates an example of an augmented pilot measurement using a neighboring OFDM symbol time. For example, the channel impulse response h may be solved by L1 norm recovery to identify significant taps in the time domain.

In one aspect, compressive sensing identified taps may be represented by a polynomial model. For example, if $\Omega$ denotes the set of CS-identified taps, then each survived tap may be used to construct a time-flat channel response, with polynomial order Q:

$$h_p(l) = \sum_{q=0}^{Q-1} \alpha_{p,q} l^q, \ p \in \Omega$$

In one example, the time-flat channel response may be converted into a vectorized channel response as follows:

$$h_\Omega(l) = \sum_{q=0}^{Q-1} \alpha_{\Omega,q} l^q$$

In another aspect, the vectorized channel response may be converted into a CS polynomial frequency response $\underline{G}(l)$ as follows:

$$\underline{G}(l) = F_{Kx|\Omega|} h(l)$$

$$= \sum_{q=0}^{Q-1} F_{Kx|\Omega|} \alpha_{\Omega,q} l^q$$

$$= [l^{Q-1} F_{Kx|\Omega|}, l^{Q-2} F_{Kx|\Omega|}, \ldots l^0 F_{Kx|\Omega|}] \begin{bmatrix} \alpha_{\Omega-1} \\ \vdots \\ \alpha_0 \end{bmatrix}$$

Next, the CS polynomial frequency response may be aggregated over L symbols to form a stacked frequency response $\underline{G}$ as follows:

$$\begin{bmatrix} \underline{G}(0) \\ \vdots \\ \underline{G}(L-1) \end{bmatrix} =$$

$$\underbrace{\begin{bmatrix} 0^{Q-1} F_{Kx|\Omega|} & 0^{Q-2} F_{Kx|\Omega|} & \cdots & 0^0 F_{Kx|\Omega|} \\ 1^{Q-1} F_{Kx|\Omega|} & 1^{Q-2} F_{Kx|\Omega|} & \cdots & 1^0 F_{Kx|\Omega|} \\ \vdots & & & \\ (L-1)^{Q-1} F_{Kx|\Omega|} & (L-1)^{Q-2} F_{Kx|\Omega|} & \cdots & (L-1)^0 F_{Kx|\Omega|} \end{bmatrix}}_{LKx|\Omega|Q} \underbrace{\begin{bmatrix} \alpha_0 \\ \vdots \\ \alpha_{Q-1} \end{bmatrix}}_{|\Omega|Qx1}$$

$$\underline{G} = \Psi \underline{\alpha}$$

In another aspect, the stacked frequency response $\underline{G}$ may be converted into a measured pilot frequency response $\Phi \underline{G}$ according to:

$$\Phi \underline{G} = \Phi \Psi \underline{\alpha}$$

$$\Leftrightarrow \underline{G}_{pilot} = W \underline{\alpha}$$

$$\Leftrightarrow \underline{Y} = W \underline{s}$$

$\underline{Y}$: $JL \times 1$, $W$: $JL \times |\Omega|$, $\underline{s}$: $|\Omega| Q \times 1$ $J$: number of pilots per symbol In one example, channel parameters $\alpha$ may be estimated from the measured pilot frequency response by a least-square procedure and then used to reconstruct the channel frequency response to form a reconstructed channel frequency response $\underline{G}(l)$ where:

$$\underline{\hat{G}}(l) = U$$

In one example, for WiMax narrowband cannel estimation, the number of pilots J=2 and the number of symbols L=10. In one example, the polynomial order Q may be selected between 2 and 4, depending on the Doppler spread.

Figure 5:
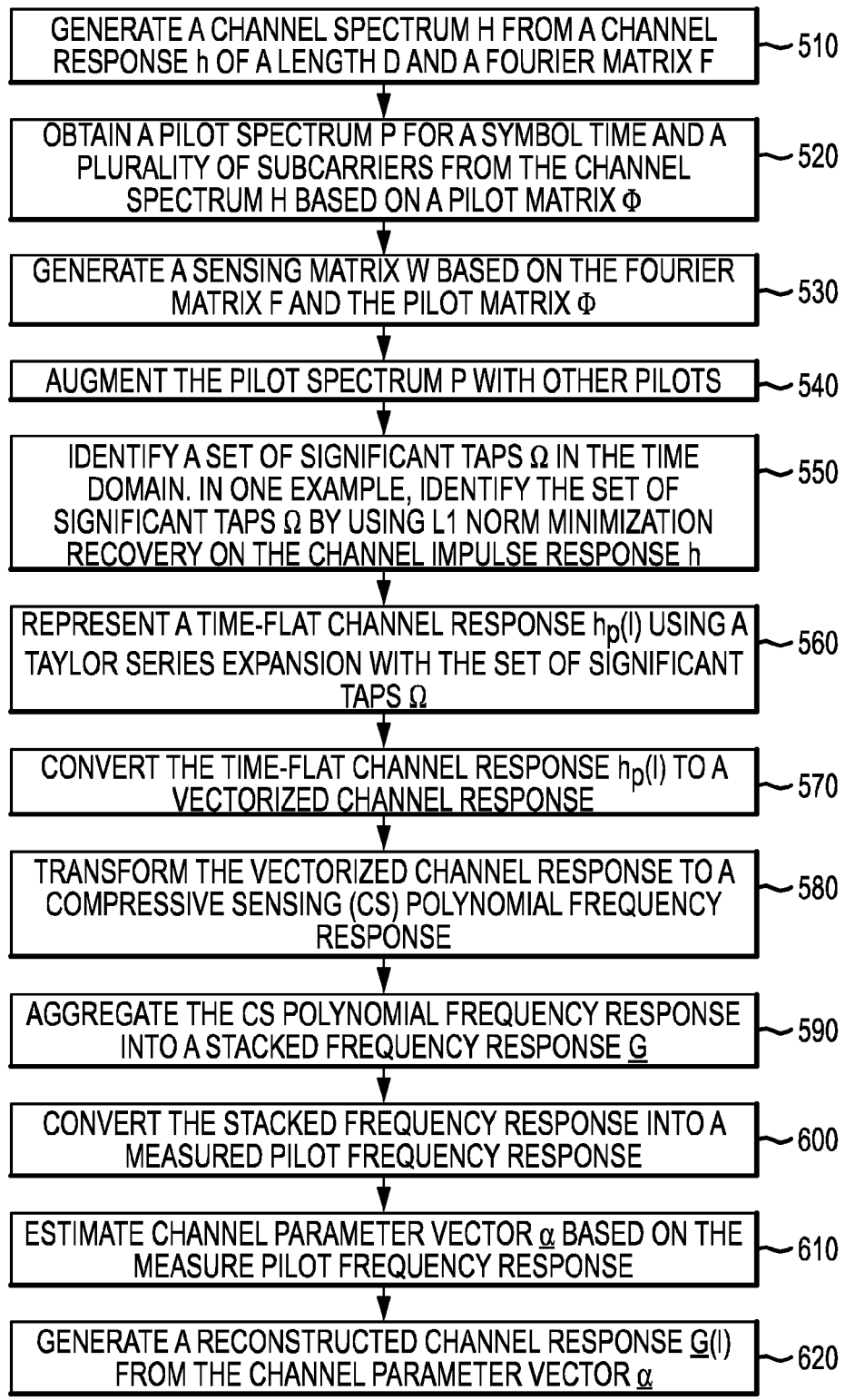
FIG. 5 illustrates an example of a flow diagram for compressive sensing tap identification for channel estimation.

FIG. 5 illustrates an example of a flow diagram for compressive sensing tap identification for channel estimation. In block 510, generate a channel spectrum H from a channel response h of a length D and a Fourier matrix F. In one example, the Fourier matrix F is a discrete Fourier transform matrix. In another example, the Fourier matrix is a fast Fourier transform matrix. In block 520, obtain a pilot spectrum P for a symbol time and a plurality of subcarriers from the channel spectrum H based on a pilot matrix $\Phi$. In one example, the number of pilots in pilot matrix $\Phi$ is less than the channel impulse response length D. In block 530, generate a sensing matrix W based on the Fourier matrix F and the pilot matrix $\Phi$. In one example, the sensing matrix W is a product of the Fourier matrix F and the pilot matrix $\Phi$. In block 540, augment the pilot spectrum P with other pilots. In one example, the other pilots are obtained from neighboring symbol times. In another example, the pilots are obtained for a same subcarrier from the plurality of subcarriers.

In block 550, identify a set of significant taps $\Omega$ in the time domain. In one example, identify the set of significant taps $\Omega$ by using L1 norm minimization recovery on the channel impulse response h. In block 560, represent a time-flat channel response $h_p(1)$ using a Taylor series expansion with the set of significant taps $\Omega$. In one example, the time-flat channel response is modeled as a polynomial of order Q, wherein Q is an integer of typically less than 4. However, one skilled in the art would understand that Q can be any integer without affecting the spirit or scope of the present disclosure.

In block 570, convert the time-flat channel response $h_p(1)$ to a vectorized channel response. In block 580, transform the vectorized channel response to a compressive sensing (CS) polynomial frequency response. In one example, the CS polynomial frequency response is transformed using a tapped Fourier matrix $F_{Kx\Omega}$. In block 590, aggregate the CS polynomial frequency response into a stacked frequency response $\underline{G}$. In block 600, convert the stacked frequency response into a measured pilot frequency response. In block 610, estimate channel parameter vector $\alpha$ based on the measure pilot frequency response. In one example, the channel parameter vector $\alpha$ may be estimated using a least-square minimization. In block 620, generate a reconstructed channel response $\underline{G}(1)$ from the channel parameter vector $\alpha$.

One skilled in the art would understand that the steps disclosed in the example flow diagram in FIG. 5 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
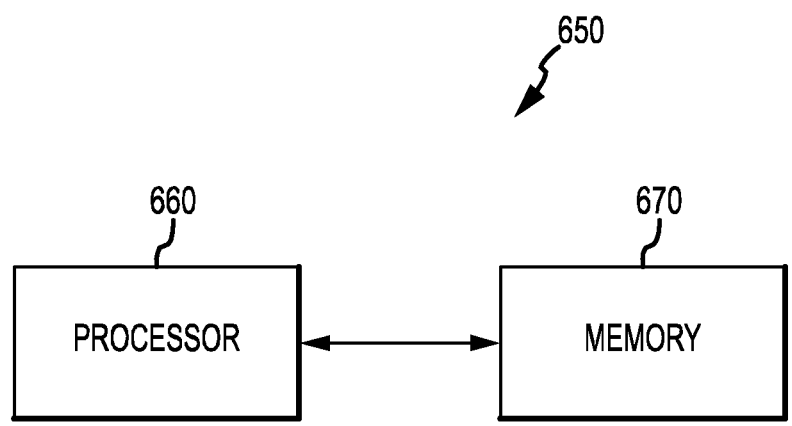
FIG. 6 illustrates an example of a device comprising a processor in communication with a memory for executing the processes for compressive sensing tap identification for channel estimation.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 6 illustrates an example of a device 650 comprising a processor 660 in communication with a memory 670 for executing the processes for compressive sensing tap identification for channel estimation. In one example, the device 650 is used to implement the algorithm illustrated in FIG. 5. In one aspect, the memory 670 is located within the processor 660. In another aspect, the memory 670 is external to the processor 660. In one aspect, the processor includes circuitry for implementing or performing the various flow diagrams, logical blocks and/or modules described herein.

Figure 7:
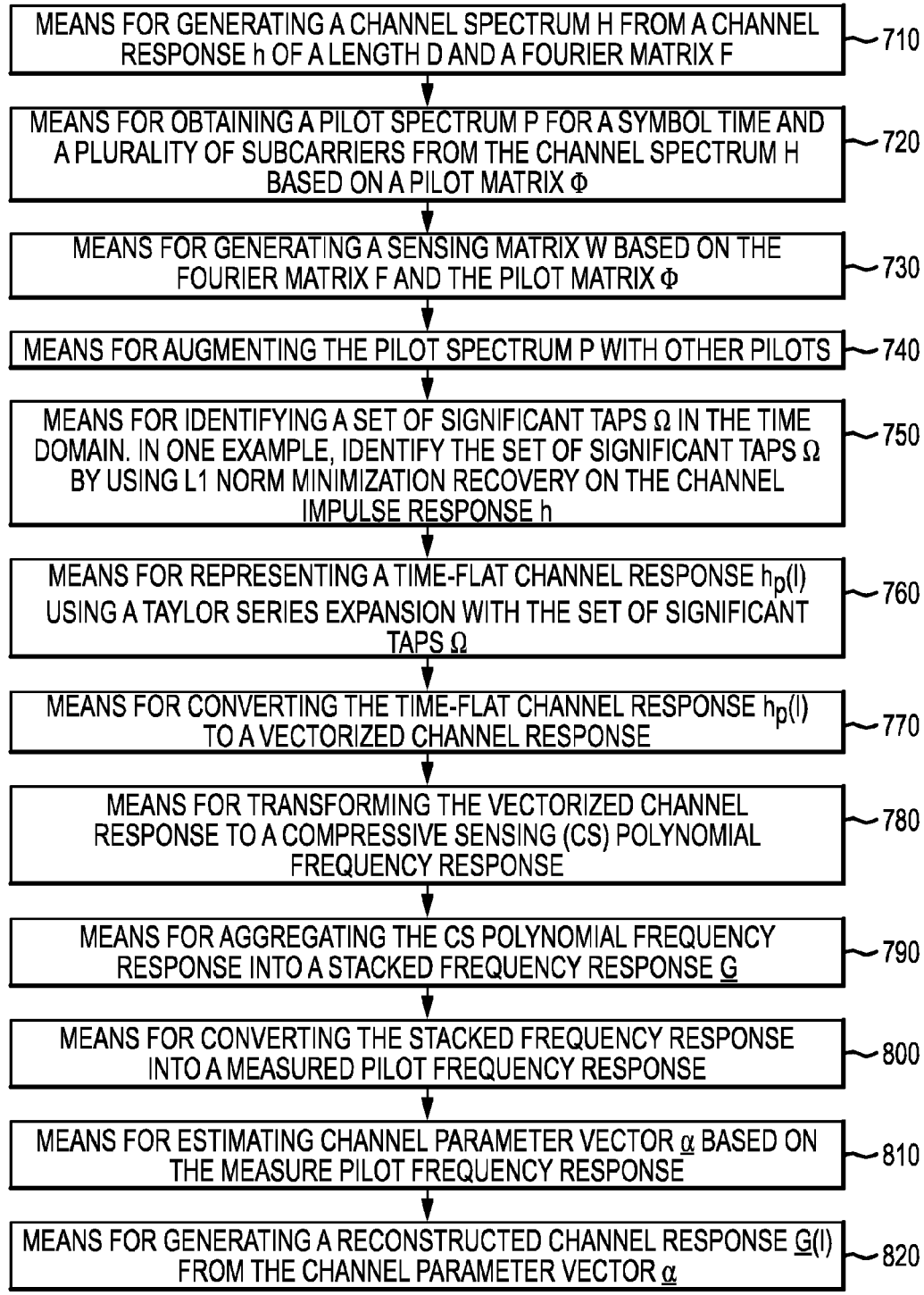
FIG. 7 illustrates an example of a device suitable for compressive sensing tap identification for channel estimation.

FIG. 7 illustrates an example of a device 700 suitable for compressive sensing tap identification for channel estimation. In one aspect, the device 700 is implemented by at least one processor comprising one or more modules configured to provide different aspects of compressive sensing tap identification for channel estimation as described herein in blocks 710, 720, 730, 740, 750, 760, 770, 780, 790, 800, 810 and 820. For example, each module comprises hardware, firmware, software, or any combination thereof. In one aspect, the device 700 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for compressive sensing tap identification for channel estimation comprising:
    identifying a set of significant taps in the time domain;
    representing a time-flat channel response using a Taylor series expansion with the set of significant taps;
    converting the time-flat channel response to a vectorized channel response;
    transforming the vectorized channel response to a compressive sensing (CS) polynomial frequency response;
    aggregating the CS polynomial frequency response into a stacked frequency response;
    converting the stacked frequency response into a measured pilot frequency response;
    estimating a channel parameter vector based on the measured pilot frequency response; and
    generating a reconstructed channel response from the channel parameter vector.

2. The method of claim 1 further comprising generating a channel spectrum from a channel response of a length D and a Fourier matrix.

3. The method of claim 2 wherein the Fourier matrix is either a discrete Fourier transform matrix or a fast Fourier transform matrix.

4. The method of claim 2 further comprising obtaining a pilot spectrum for a symbol time and a plurality of subcarriers from the channel spectrum based on a pilot matrix.

5. The method of claim 4 further comprising generating a sensing matrix based on the Fourier matrix F and the pilot matrix.

6. The method of claim 5 wherein the sensing matrix is a product of the Fourier matrix and the pilot matrix.

7. The method of claim 5 further comprising augmenting the pilot spectrum with other pilots.

8. The method of claim 7 wherein the other pilots are obtained for a same subcarrier from the plurality of subcarriers.

9. The method of claim 1 further comprising using a tapped Fourier matrix to transform the vectorized channel response to the compressive sensing (CS) polynomial frequency response.

10. The method of claim 1 wherein the set of significant taps is identified by using a L1 norm minimization recovery on a channel impulse response.

11. An apparatus for compressive sensing tap identification for channel estimation comprising:
- means for identifying a set of significant taps in the time domain;
- means for representing a time-flat channel response using a Taylor series expansion with the set of significant taps;
- means for converting the time-flat channel response to a vectorized channel response;
- means for transforming the vectorized channel response to a compressive sensing (CS) polynomial frequency response;
- means for aggregating the CS polynomial frequency response into a stacked frequency response;
- means for converting the stacked frequency response into a measured pilot frequency response;
- means for estimating a channel parameter vector based on the measured pilot frequency response; and
- means for generating a reconstructed channel response from the channel parameter vector.

12. The apparatus of claim 11 further comprising means for generating a channel spectrum from a channel response of a length D and a Fourier matrix.

13. The apparatus of claim 12 wherein the Fourier matrix is either a discrete Fourier transform matrix or a fast Fourier transform matrix.

14. The apparatus of claim 12 further comprising means for obtaining a pilot spectrum for a symbol time and a plurality of subcarriers from the channel spectrum based on a pilot matrix.

15. The apparatus of claim 14 further comprising means for generating a sensing matrix based on the Fourier matrix F and the pilot matrix.

16. The apparatus of claim 15 wherein the sensing matrix is a product of the Fourier matrix and the pilot matrix.

17. The apparatus of claim 15 further comprising means for augmenting the pilot spectrum with other pilots.

18. The apparatus of claim 17 wherein the other pilots are obtained for a same subcarrier from the plurality of subcarriers.

19. The apparatus of claim 11 further comprising means for using a tapped Fourier matrix to transform the vectorized channel response to the compressive sensing (CS) polynomial frequency response.

20. The apparatus of claim 11 wherein the set of significant taps is identified by using a L1 norm minimization recovery on a channel impulse response.

21. An apparatus for compressive sensing tap identification for channel estimation comprising a processor and a memory, the memory containing program code executable by the processor for performing the following:
- identifying a set of significant taps in the time domain;
- representing a time-flat channel response using a Taylor series expansion with the set of significant taps;
- converting the time-flat channel response to a vectorized channel response;
- transforming the vectorized channel response to a compressive sensing (CS) polynomial frequency response;
- aggregating the CS polynomial frequency response into a stacked frequency response;
- converting the stacked frequency response into a measured pilot frequency response;
- estimating a channel parameter vector based on the measured pilot frequency response; and
- generating a reconstructed channel response from the channel parameter vector.

22. The apparatus of claim 21 wherein the memory further comprising program code for generating a channel spectrum from a channel response of a length D and a Fourier matrix.

23. The apparatus of claim 22 wherein the Fourier matrix is either a discrete Fourier transform matrix or a fast Fourier transform matrix.

24. The apparatus of claim 22 wherein the memory further comprising program code for obtaining a pilot spectrum for a symbol time and a plurality of subcarriers from the channel spectrum based on a pilot matrix.

25. The apparatus of claim 24 wherein the memory further comprising program code for generating a sensing matrix based on the Fourier matrix F and the pilot matrix.

26. The apparatus of claim 25 wherein the sensing matrix is a product of the Fourier matrix and the pilot matrix.

27. The apparatus of claim 25 wherein the memory further comprising program code for augmenting the pilot spectrum with other pilots.

28. The apparatus of claim 27 wherein the other pilots are obtained for a same subcarrier from the plurality of subcarriers.

29. The apparatus of claim 21 wherein the memory further comprising program code for using a tapped Fourier matrix to transform the vectorized channel response to the compressive sensing (CS) polynomial frequency response.

30. The apparatus of claim 21 wherein the set of significant taps is identified by using a L1 norm minimization recovery on a channel impulse response.

31. A non-transitory computer-readable medium for compressive sensing tap identification for channel estimation, the computer-readable medium storing a computer program, wherein execution of the computer program is for:
- identifying a set of significant taps in the time domain;
- representing a time-flat channel response using a Taylor series expansion with the set of significant taps;
- converting the time-flat channel response to a vectorized channel response;
- transforming the vectorized channel response to a compressive sensing (CS) polynomial frequency response;
- aggregating the CS polynomial frequency response into a stacked frequency response;
- converting the stacked frequency response into a measured pilot frequency response;
- estimating a channel parameter vector based on the measured pilot frequency response; and
- generating a reconstructed channel response from the channel parameter vector.

32. The computer-readable medium of claim 31 wherein execution of the computer program is also for generating a channel spectrum from a channel response of a length D and a Fourier matrix.

33. The computer-readable medium of claim 32 wherein the Fourier matrix is either a discrete Fourier transform matrix or a fast Fourier transform matrix.

34. The computer-readable medium of claim 32 wherein execution of the computer program is also for obtaining a pilot spectrum for a symbol time and a plurality of subcarriers from the channel spectrum based on a pilot matrix.

35. The computer-readable medium of claim 34 wherein execution of the computer program is also for generating a sensing matrix based on the Fourier matrix F and the pilot matrix.

36. The computer-readable medium of claim 35 wherein the sensing matrix is a product of the Fourier matrix and the pilot matrix.

37. The computer-readable medium of claim 35 wherein execution of the computer program is also for augmenting the pilot spectrum with other pilots.

38. The computer-readable medium of claim 37 wherein the other pilots are obtained for a same subcarrier from the plurality of subcarriers.

39. The computer-readable medium of claim 31 wherein execution of the computer program is also for using a tapped Fourier matrix to transform the vectorized channel response to the compressive sensing (CS) polynomial frequency response.

40. The computer-readable medium of claim 31 wherein the set of significant taps is identified by using a L1 norm minimization recovery on a channel impulse response.

* * * * *